Nov. 15, 1932.  K. HOLLERER ET AL  1,888,169

PRESS BUTTON

Original Filed Feb. 28, 1930  2 Sheets-Sheet 1

Inventors.
K. Hollerer,
Adolf Kadletz.

Nov. 15, 1932.  K. HOLLERER ET AL  1,888,169
PRESS BUTTON
Original Filed Feb. 28, 1930  2 Sheets-Sheet 2
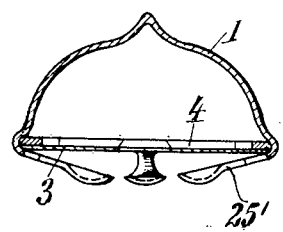
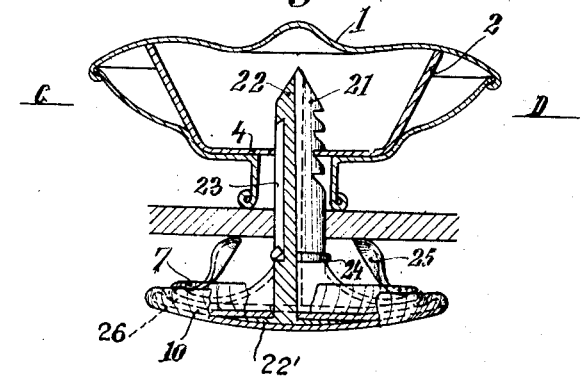
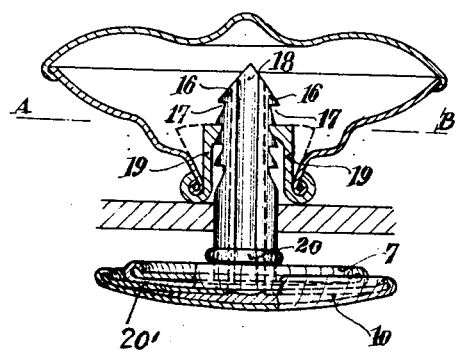
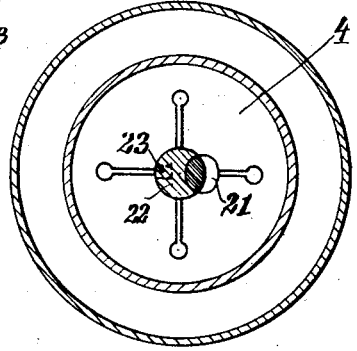
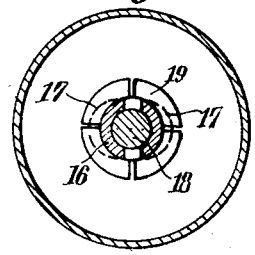
Inventors
K. Hollerer,
Adolf Kadletz.

Patented Nov. 15, 1932

1,888,169

UNITED STATES PATENT OFFICE

KARL HOLLERER AND ADOLF KADLETZ, OF VIENNA, AUSTRIA

PRESS BUTTON

Application filed February 28, 1930, Serial No. 432,239, and in Austria January 2, 1929. Renewed October 6, 1932.

This invention relates to improvements in press-buttons of the kind in which the head portion is secured to the cloth, leather or the like by a pin, provided with a broad forward end and engaging a depression or recess in the head portion, the operative diameter of the said pin being enlarged by a cotter or wedge axially inserted with respect to the pin. The press-button is disengaged by removing said cotter or wedge.

According to the present invention the operative diameter of the pin is enlarged either by a wedge-shaped member of crescent shape, whereby in the operative position the pin is fixed by a small spring plate, which is mounted in the depression or recess of the head portion and is holed for the reception of the pin, or the operative diameter of the latter is enlarged inserting a cylindrical core into a hollow pin with a slotted enlarged head.

According to a modified construction the operative diameter of the pin is enlarged by forming it of two parts, which are provided with serrations or teeth at the outside and between which a wedge-shaped member is inserted.

With these and other objects in view, our invention consists in the arrangement, construction and combination of the various parts of our improved press-buttons as described in the specification, claimed in the claims and illustrated in the accompanying drawings, in which:—

Figs. 4 and 5 show another construction of the press-button in sectional elevation and sectional plan view respectively.

Figs. 6 and 7 illustrate a fourth construction of the press-button in sectional elevation and sectional plan view respectively.

Fig. 8 is a detail view in section of another form of top member.

Figure 1:
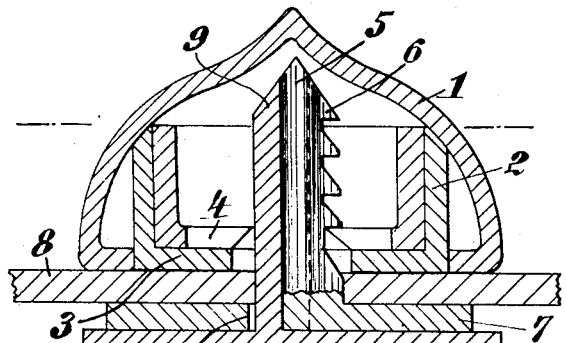
Figs. 1 and 2 show a press-button in sectional elevation and sectional plan view respectively.
Figure 2:
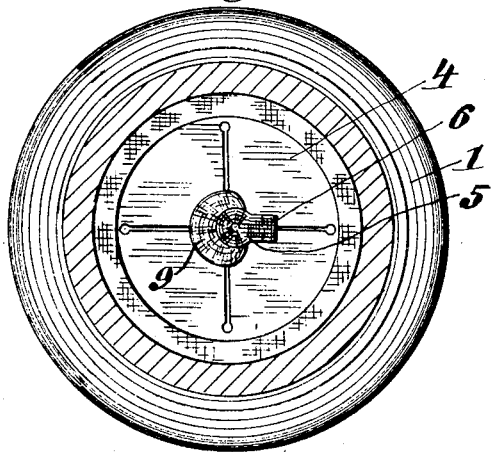

A sleeve or barrel 2 with an inwardly extending rim 3 is pressed into top member 1 of a press-button (Figs. 1 and 2) and provided with a spring-plate 4. The latter is furnished with a hole for the insertion of a bottom member or pin 5, which is notched at 6 and provided with an enlarged head 7, adapted to force the cloth 8 or the like against the top member 1, when the pin is introduced into the latter. A wedge 9 of crescent shaped cross-section is stamped out of a plate 10 and can be pushed into the head 7 of the pin 5 by way of a crescent-shaped slot 11 formed in said head 7. The end of the wedge 9 is tapered and rests against the pin 5. When inserting the latter, the spring-plate 4 yields upwardly and, by means of the wedge 9, is moved into engagement with one of the notches 6 of the pin 5 and thus fixed in the locked position. The pin 5 can be removed from the top member 1 by withdrawing the wedge 9.

Figure 3:
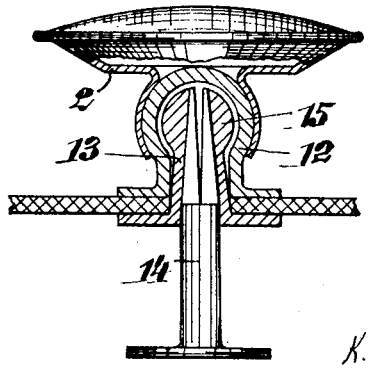
Fig. 3 illustrates a modified construction of a press-button in sectional elevation.

In the construction shown in Fig. 3, the barrel or sleeve 2 of the top member is provided with a bulged portion 12 for the reception of a split head 15 of a hollow pin 13. When inserting the wedge or core 14, the parts of the split head are spread apart and thus the pin is removably secured in the top member of the button.

In the construction shown in Figs. 4 and 5, the pin consists of two parts 16 which are separated by an axial slot. This slot becomes narrower towards the pointed end of the pin, so that both parts 16 are inclined with respect to one another before the insertion of the core 18. The parts 16 of the pin are interlocked with the disk 20', which in turn is connected with the plate 10 forming the base of the pin. The said plate is provided with a recess which is in communication with said slot and allows the passage of the core 18, the latter forcing apart the two parts of the pin. The upper portion of the two parts 16 of the pin is provided with oppositely disposed notches 17, which secure the pin in the top member. This is accomplished in that four tongues 19 are hinged or pivoted to the bottom end of the top member and extend into the interior of the latter. The bottom portion of the two-part pin 16 is provided with a semi-circular groove for the reception of a clamping ring 20. The operation of this press-button will be readily understood from the aforesaid. It is remarked, that the device can be readily engaged and disengaged and is securely fixed to the cloth or the like.

In the construction shown in Figs. 6, 7, and 8 the pin 21 is arranged out of the centre of its bearing plate 10, which is provided with a recess for the insertion of a core or wedge 22. The outside of the pin 21 is provided with notches, which are adapted to be engaged by the spring-plate 4 of the top member 1. This spring-plate is provided with radially extending slots (Fig. 7). At the opposite side of the notches, the core 22 is provided with a groove 23 and at its bottom portion with a semi-circular groove for the reception of the terminals of a clamping ring 24. The groove 23 does not extend up to the pointed end of the core, and the ends thereof constitute stops for the ring terminals for limiting the movement of said core vertically.

Also in this construction, the core or wedge 22 terminates in a second plate 22′ and is of crescent shape in cross-section, so that it partly surrounds the pin and thereby provides a guide for moving the wedge along the pin. This movement is rendered possible in spite of the arrangement of the clamping ring, passing round the wedge and pin, in view of the provision of the longitudinal groove 23. The operation of this device will be readily understood from the aforesaid.

In the embodiment illustrated in Figs. 6, 7 and 8 is also an arrangement by which either the plate carrying the pin or the bottom side of the top part of the button is pressed onto the cloth or the like in order to fix the button in position.

In Fig. 6, the resilient tongues 25 are carried by a plate 26, said plate being secured to the plate 10 in an appropriate manner. These tongues are adapted to yieldably engage the adjacent faces of the cloth when the core 22 is engaged in the member 1. The top member in Fig. 8 is provided with tongues 25′, said tongues being adapted to engage the serrations in a manner similar to the engagement of the tongues 19 shown in Fig. 4.

We claim:—

1. A press button comprising a top member, spring members connected thereto, a pin insertible between the spring members and having serrations for selective engagement therewith, a wedge member slidable longitudinally of the pin, and means carried by the pin for guiding the wedge member, said wedge member serving to retain selective serrations engaged with the resilient members.

2. A press button comprising a top member, a sleeve in said top member, movable elements carried by the sleeve, a pin having serrations carried thereby, and a wedge member slidably guided on the pin to retain selected serrations thereof engaged with the movable elements.

3. A press button comprising a top member, having tongues therein, a split pin having serrations thereon, a groove in said pin constituting a guide, and a wedge insertible in the groove to retain selected serrations of the pin engaged with the tongues.

4. A press-button comprising a top member having tongues therein, a split pin insertible in the top member and having serrations thereon, a core engageable between the parts of the pin for holding the serrations engaged with the tongues, said pin having semicircular grooves therein, and a clamping ring engaged in the grooves.

In testimony whereof we have affixed our signatures.

KARL HOLLERER.
ADOLF KADLETZ.